United States Patent [19]

Shaw et al.

[11] 4,452,706

[45] Jun. 5, 1984

[54] METALS RECOVERY

[75] Inventors: John R. H. Shaw, Johannesburg, South Africa; Diana M. Anderson nee Mounsey, Runcorn, England

[73] Assignee: Interox Chemicals Limited, London, England

[21] Appl. No.: 548,622

[22] Filed: Nov. 4, 1983

[30] Foreign Application Priority Data

Nov. 11, 1982 [GB] United Kingdom ................. 8232252

[51] Int. Cl.$^3$ .............................................. C25C 1/08
[52] U.S. Cl. .................................... 210/722; 210/758; 210/911; 210/912; 75/101 R; 75/115; 75/117; 75/119; 75/120; 75/101 BE; 423/138; 423/150; 423/87
[58] Field of Search ..................... 210/758, 911–912, 210/722; 423/138, 150, 87; 75/101 R, 115, 117, 119, 120, 101 BE

[56] References Cited

U.S. PATENT DOCUMENTS 4,201,667  5/1980  Liao ..................................... 210/911
4,244,734  1/1981  Reynolds et al. ................. 75/101 R Primary Examiner—R. L. Andrews
Attorney, Agent, or Firm—Larson and Taylor

[57] ABSTRACT

Various metals including cobalt nickel and copper can be recovered from a roasted ground ore or waste and particularly from tailings of a pyritic gold ore by leaching with sulphuric acid, oxidizing the separated leach liquor, filtering and partially neutralizing the liquor. In an improved process, the oxidation is effected with peroxomonosulphuric acid and the neutralization with a 60:40 to 40:60 mixture of calcium and sodium hydroxide/oxide. By so doing, it is possible to minimize the number of process stages by elimination of either or both solid/liquid separations and to combine the leach and oxidation stage, or to improve the separation of metals from impurities.

16 Claims, No Drawings

METALS RECOVERY

The present invention relates to a process for the recovery of metals and in particular the selective recovery of one or more of cobalt, nickel, copper and zinc from iron and arsenic containing solids.

In many ores throughout the world, various of the more highly desirable metals such as cobalt, nickel, copper and zinc are present, often in a minor amount, with iron minerals, often as the major constituent and such ores can also contain in at least some instances a detectable proportion of arsenic. By and large, the value of the metal produced varies in accordance with its purity. Thus, it is highly desirable to produce as final product, a metal that is substantially free from iron and/or arsenic, but naturally it is also highly desirable to recover as high a proportion of the preferred metal or metals as is practical. It is necessary when considering the practicality of recovering any particular metal to take into account not only the final value of the metal but the reagent and other processing costs inherent in recovering that metal. Moreover, a solid precipitate such as obtainable from iron and a third phase, such as inducable by arsenic, will interfere with solvent recovery processes.

According to the present invention, there is provided a process for the purification of an aqueous acidic leach liquor obtained by contacting a solid minerals mass containing one or more of the metals, cobalt, nickel, copper, and zinc together with iron and arsenic with a sulphuric acid solution, in which purification process the iron and arsenic in solution are oxidised to, respectively, ferric and arsenic ions by introduction of peroxomonosulphuric acid, and the leach liquor is subsequently partially neutralised to a pH in the range of 3.5–4.8 by the introduction of a mixed neutralising agent comprising from 40–60 molar% calcium oxide or hydroxide and the balance sodium hydroxide.

It will be understood that the leaching stage in which the metals are leached into solution can readily be effected using solely a solution of sulphuric acid having the desired acidity, which in practice normally means having a pH whilst in contact with the minerals of not greater than pH 2.3, normally at least pH 1.0, and often selected in the range of pH 1.5 to 2.1. The extent of extraction of the desired metals such as cobalt, nickel, copper and zinc in solution tends to vary inversely with increase in pH, so that somewhat higher degrees of extraction of metals are attainable at, for example pH 1.5 than at pH 2.0. The solids are normally agitated with the lixiviant for at least 1.5 hours typically up to 24 hours, and in many cases from 2 to 8 hours often at a pulp density selected in the range of 10 to 60% by weight at a temperature of at least 40° C. and often from 50° to 80° C. The pregnant leach liquor at the end of the contact period, can be separated from the residue by a conventional solid/liquid separating apparatus, such as filters, decantation, cyclones and mixer-settlers. The peroxomonosulphuric acid can conveniently be introduced into the separated leach liquor in an amount sufficient to obtain and subsequently maintain a potential in the leach liquor at which iron is oxidised to ferric ion and arsenic to arsenate.

Whilst the minimum electro-chemical potential tends to vary with variations in the pH of the solution, in practice, the oxidations will occur if a potential of at least 400 mV with respect to a standard calomel electrode is maintained. For the sake of safety, it is preferable to maintain the potential in the region of at least 500 mV, often from 500 to 800 mV. The oxidation stage can be carried out at any temperature from ambient to the boiling point of the liquor but to minimize any decomposition of the oxidant, the temperature is in preference limited to not more than 90° C. and conveniently at least 100° C., often from 50° to 80° C. as in the extraction stage. Although it is very convenient to introduce the oxidant under control of the monitor for the electropotential, it is possible to employ an alternative technique of determining the iron and arsenic, and other materials present in the solution that are oxidisable at a pH of below pH 2.3, and based thereon introducing sufficient oxidant to oxidise the desired proportion of those impurities. In practice, it is preferable to employ at least a stoichiometric amount of oxidant, on the aforementioned basis, and especially from 1 to 1.25 times the stoichiometric amount. Usually, the oxidised leach liquor is then subjected to a further solid/liquid separation stage prior to the subsequent partial neutralisation stage.

It is well understood that one method of separating iron from an acidic solution of other metals is to partially neutralise that solution, thereby precipitating the iron as ferric hydroxide or the basic iron salt, but it is highly undesirable to employ a neutralising agent such as ammonia in view of subsequent interference in cobalt/nickel separation. The partial neutralisation stage can also result in quite considerable losses of the valued metals from solution, coprecipitating with the unwanted iron and arsenate. Thus, for example, a substantial proportion of copper will be lost from solution if calcium oxide or hydroxide is employed as the neutralising agent. On the other hand, if sodium hydroxide is employed as the neutralising agent, the resulting precipitate is often somewhat gelatinous and therefore presents difficulties in separating from the supernatant liquor. It has been found that by employing a mixture though, of calcium and sodium hydroxides/oxides in the mole ratio of 60–40 to 40–60, a surprising increase in the retention of, for example copper in solution is achievable, together with the provision of a precipitate that remains readily separable by conventional techniques. In comparisons with other mixtures of calcium and sodium hydroxides outside the specified range results indicate that enhanced desired metal retention in the leach liquor occurs when the mixture of neutralising agents is employed in the specified ratio.

It has further been established that certain modifications to the aforementioned stages can be employed, whilst retaining the benefit of desired metal retention. In a first modification, if the desired metal leaching and impurity metal oxidation stages can be combined in a single stage, either by effecting the leaching and the oxidation in sequential stages and not employing an intervening solid/liquid separation, or alternatively by contemporaneously maintaining the leach solution during leaching at the aforementioned electropotential for the impurity oxidation phase. This contemporaneous process is most conveniently effected by progressively introducing the oxidant into the leach liquor during the period of leaching so as to maintain a desired electropotential or to periodically return the leach liquor to a selected electropotential or to cause the potential to fluctuate about a desired value. Advantageously, it has been found that by employing peroxomonosulphuric acid as the oxidant in such a process, substantially the same retention of desired metals in the leach liquor occurs as in the non-modified process, whilst omitting a costly separation stage. Indeed, in at least some combinations of conditions, it was found that after the subsequent neutralisation the resultant leach liquor retained a higher proportion of such metals as cobalt and nickel as well as copper when the oxidation of impurities occurred in the presence of the solids residue than occurred in their absence. It was noted in addition that the resultant impurity iron and arsenate concentrations though were present in comparable amounts whether or not the aforementioned modification was employed.

Thus, in one set of highly desirable embodiments of the instant invention, the minerals are contacted with an oxidising sulphuric acid leach liquor maintined at a pH of below pH 2.3 and particularly from pH 1.7 to 2.1, having an electropotential of from 500 to 800 mV with respect to a standard calomel electrode at a temperature of from 50 to 80° C. for a period of from 2 to 8 hours, the residue and pigment leach liquor subsequently being separated and the separated leach liquor being partially neutralised to a pH of from 3.5 to 4.8, preferably pH 4 to 4.8 with calcium hydroxide and sodium hydroxide in a respective mole ratio of 60:40 to 40:60. It will be further understood that the peroxomonosulphuric acid need not be introduced throughout the entire extraction period, but that it can be introduced during the latter part of the period only, for example during the last half an hour to an hour of the period, preferably in a progressive manner and especially under the control of a calomel electrode set in the range 500 to 700 mV.

In a further modification of the instant invention, it has been found that at least in certain circumstances, it is possible not only to omit with advantage the solid/liquid separation stage between the metals extraction and impurity oxidation stages, but in addition it is possible to omit with advantage or at the very least without detriment, the solid/liquid separation phase between the impurity oxidation stage and the partial neutralisation stage. In such a further modification, it is highly desirable to conduct the combined extraction and oxidiation stages at a pH maintained in the region of 1.7 to 2.1. By so doing, it has been found that, in conjunction with the use of the mixed neutraliser, a very high proportion of the desired metals, and in particular cobalt and nickel, can be retained in solution whereas under similar conditions, but using only the calcium base, a greater loss of the desired metals occurs. This indicates that there is to a certain extent interaction between the minerals residue and the supernatant pregnant leach liquor.

In general, the solid minerals mass has desirably been ground before the extraction stage, usually to below a particle size of 1000 microns and often to an average particle size of below 200 microns. The processes of the present invention are particularly applicable to the selective recovery of copper, nickel, cobalt and zinc from sulphidic ores which have been subjected to a sulphating calcination step, and in particular to tailings from pyritic gold-bearing minerals from which the gold has been previously extracted. Such tailings, especially after flotation, have an average particle size in the range 90–150 microns and a sulphating roast thereof can product a calcine which after neutralisation contains as the principal metal iron, and a substantial amount of arsenic, in addition to the desired metals of cobalt, nickel, copper and zinc, which can total in many instances from a 1/5 to a ½ the weight or iron in the treated and neutralised tailings. By use of the techniques according to the present invention described herein, it is possible to extract the major proportion of the desired metals, that is to say in most cases at least 70% in total and in many cases from 80 to 90% of individual metals whilst leaving substantially the greater part of the undesired metals, namely iron and arsenic in the separated spent residue. Depending to a certain extent upon the precise conditions selected, it has been found possible to produce a leach liquor in which the weight ratio of iron to the total of the four desired metals is considerably less than 1:100 and there is substantially no arsenic remaining in solution, even without carrying out any intermediate solid liquid separation stages.

The leach liquor after separation from the residue can thereafter be treated in known manner for the selective recovery of the four metals individually. Thus, for example, copper can be selectively recovered by a solvent extraction technique using a copper-specific extractant selected from the class of hydroxy oximes and which are known and available commercially. Likewise, for example, the cobalt and nickel can be separated by similar solvent extraction techniques or by oxidation with peroxomonosulphuric acid and selective precipitation by control of pH conditions.

The peroxymonosulphuric acid employed in the process of the instant invention can conveniently be made by reaction between concentrated aqueous hydrogen peroxide and concentrated sulphuric acid or oleum, especially employing 65–70% hydrogen peroxide and 92–98% aqueous sulphuric acid in a mole ratio of $SO_3$:$H_2O_2$ of from 2.5:1 to 4.0:1, or the equivalent amounts of different grades of hydrogen peroxide and sulphuric acid/oleum to provide the same mole ratios of water, hydrogen peroxide, and $H_2SO_4$. By the use of such ratios of reagents, when mixed under strictly controlled temperatures, the resultant solution contains a high mole ratio of peroxomonosulphuric acid to residual hydrogen peroxide, thereby rendering it particularly suitable for the instant process.

The neutralisation with a mixture of calcium oxide/hydroxide and sodium hydroxide can be carried out in a variety of different ways. The two reagents can be added separately or together, and can be introduced either simultaneously or sequentially. Where they are added separately, there is no particular advantage in either order of addition. For convenience, the calcium base can be added as a solid, or if desired as a slurry, and the sodium base is most conveniently added as an aqueous solution. The method selected can vary depending on the scale of the operation. On a laboratory scale it can be more convenient to determine beforehand the amount of one reagent required to neutralise entirely to a given pH, and to employ for example approximately half that amount and employing therewith are the simultaneously or sequentially enough of the other base to lift the pH to the desired figure. Of course, on a plant scale, a similar procedure could be adopted, based upon analysing a sample of the liquor or alternatively reagents could be metered into solution in the pre-desired mole ratio.

Having described the invention in general terms, specific embodiments thereof will now be described more fully by way of example only. It will be fully understood that the skilled person in the field of metal recovery can vary the examples given in accordance with the foregoing text and in the light of his background knowledge without departing materially from the spirit of the present invention.

The following examples were carried out using a starting material a sludge of tailings from a pyritic mineral from which gold had previously been extracted and then subjected to a sulphating roast and neutralisation. On a dried weight basis as the metal itself, it contained cobalt 0.8%, nickel 0.5%, copper 1%, zinc 0.7% arsenic 2.6%, magnesium 3.5% aluminium 8% and silicon 7%. The metal analyses were carried out by atomic absorption spectrophotometry or by colourimetric techniques, as required.

In Example 4 and comparisons 1 to 3, 265 g (dry weight) of sludge having an approximately 20% solids content by weight was leached with an aqueous sulphuric acid solution comprising 1250 mls of water and sufficient sulphuric acid to adjust the pH of the leach liquor to 2.0 and the resultant diluted slurry was agitated for 6 hours at a temperature of 60° C. at that pH. The solids were then filtered off and the pregnant leach liquor was then contacted with a solution of peroxomonosulphuric acid obtained by reacting 70% aqueous hydrogen peroxide with 98% sulphuric acid in a mole ratio of $H_2O_2:H_2SO_4$ of 1:3. The oxidation was carried out without any other adjustment of the pH until the potential had exceeded 600 mV with respect to a standard calomel electrode and at ambient temperature. The resultant solution was then neutralised to a pH of 4.5 with solely calcium hydroxide in comparison 1 or with mixtures of calcium hydroxide and sodium hydroxide being in the mole ratio of 3:1 and 1:3 in respectively comparisons 2 and 3 and 1:1 in Example 4. In carrying out the neutralisation, that ratio was achieved by employing in comparisons 2 and 3 and Example 4 initially $\frac{3}{4}$, $\frac{1}{4}$ or a $\frac{1}{2}$ the entire amount of calcium hydroxide needed in comparison 1 and subsequently adjusted the pH to 4.5 by addition of sodium hydroxide on a pH stat.

The results are summarised in Table 1 below, in which all the concentrations of metals are miligrams per liter. The symbol "—" indicates that 0.1% or less of the metal remained in solution.

TABLE 1

|  | Co | Ni | Cu | Zn | Fe | As |
|---|---|---|---|---|---|---|
| Unoxidised Liquor | 1617 | 1100 | 2146 | 1505 | 10 | 789 |
|  | 85% | 85% | 90% | 95% | — | 1% |
| Comp 1 | 1232 | 907 | 813 | 1356 | 1 | 0.8 |
|  | 76% | 82% | 38% | 90% | — | — |
| Comp 2 | 1157 | 886 | 807 | 1324 | 1 | 1 |
|  | 72% | 81% | 38% | 88% | — | — |
| Comp 3 | 1248 | 940 | 1049 | 1471 | 1 | 0.3 |
|  | 77% | 86% | 49% | 98% | — | — |
| Ex 4 | 1280 | 929 | 1263 | 1456 | 1 | 0.2 |
|  | 79% | 85% | 59% | 97% | — | — |

From Table 1 above, it can be seen that the metal retention of the desired metals in solution is better when taken as a whole than in the comparisons, and that in particular the advantage is noticeable in respect of copper. Of the other metals, cobalt is marginally the best and nickel and zinc are very close to the best. It must be remembered that introduction of the neutralising agent dilutes to a small extent the liquor.

When a comparable experiment was carried out employing solely sodium hydroxide as neutralising agent also to pH 4.5, the resultant precipitate was gelatinous in nature and exceedingly difficult to separate from the supernatant liquor and in addition the liquor retained about 200 mg/kg of arsenic in solution which would interfere in subsequent separation of the four desired metals or be retained as an unwanted impurity.

Comparison 5 and Example 6.

In this comparison and example, the general procedure of the leaching stage of the preceding comparisons and example was repeated, but in addition, peroxomonosulphuric acid was introduced into the leach liquor during the leaching stage under the control of the potential monitor in order to maintain an electropotential of 800 mV. The peroxomonosulphuric acid employed was a further sample of that employed in the preceding comparisons and example that had been diluted before use to a 10% concentration. After the oxidative leach had been carried out, the liquor was separated from the residue by filtration and its pH subsequently adjusted to pH 4.5 by calcium hydroxide in comparison 5 and a 1:1 ratio of calcium hydroxide and sodium hydroxide in Example 6. The results are summarised in Table 2 below.

TABLE 2

|  | Co | Ni | Cu | Zn | Fe | As |
|---|---|---|---|---|---|---|
| Pregnant Liquor | 1238 | 880 | 1677 | 1161 | 17 | 895 |
|  | 81% | 85% | 88% | 91% | 0.2% | 18% |
| Comp 5 | 1076 | 818 | 738 | 1137 | 1 | 0.1 |
|  | 87% | 93% | 44% | 98% | — | — |
| Ex 6 | 1238 | 853 | 1241 | 1137 | 1 | 0.5 |
|  | 100% | 97% | 74% | 98% | — | — |

From Table 2 in can be seen that once again, the use of the mixed neutralising agent according to the present invention led to improved metal retention in the liquor after neutralisation to remove the unwanted iron and arsenic impurities. From comparison with Table 1, though, it would be observed that the presence of oxidant, as expected, had little effect upon the extraction of the desired metals into solution in the first place.

Comparisons 7 and 9 and Examples 8 and 10

In these comparisons and Examples, the procedure of comparison 5 and Example 6 was repeated, except that the potential was maintained at 650 mV by the introduction of the permonosulphuric acid and the resultant leach liquor and residue slurry was divided into two portions, the first portion in comparison 7 and Example 8 being filtered in the same way as in comparison 5 and Example 6 and the other portion being left unfiltered. The liquid and liquor/residue slurry were then partially neutralised to pH 4.5 at ambient temperature, with calcium hydroxide in comparisons 7 and 9 and 1:1 mixture of calcium hydroxide and sodium hydroxide in Examples 8 and 10. The results are summarised in Table 3 below.

TABLE 3

|  | Co | Ni | Cu | Zn | Fe | As |
|---|---|---|---|---|---|---|
| Pregnant Liquor | 1182 | 821 | 1470 | 998 | 1800 | 2040 |
|  | 82% | 84% | 81% | 83% | 13% | 36% |
| Comp 7 (Filtered) | 957 | 640 | 910 | 809 | 5 | 23 |
|  | 81% | 78% | 62% | 81% | — | 1% |
| Ex 8 (Filtered) | 1100 | 714 | 1240 | 879 | 5 | 34 |
|  | 93% | 87% | 84% | 88% | — | 2% |
| Comp 9 Unfiltered | 11 | 16 | 20 | 10 | 5 | 0.5 |
|  | 1% | 2% | 1% | 1% | — | — |
| Ex 10 (Unfiltered) | 1087 | 714 | 830 | 879 | 5 | 0.1 |
|  | 92% | 87% | 57% | 88% | — | — |

From Table 3 above, it can be seen once again that even on solutions in which a higher proportion of iron and arsenic went into solution, the mixed neutralising agent enabled a higher proportion of the desired metals to remain in solution whilst continuing to enable a very high proportion of the undesired metals to be precipitated as a solution than did neutralisation with solely calcium base. It is also apparent that the mixed neutralising agent enabled the intermediate separation of solid residue from the supernatent liquor to be omitted.

Comparison 9 and Example 10 were repeated, but employing instead a leach liquor, the pH of which was maintained at pH 1.5 instead of pH 2. Broadly speaking it was found that the level of undesired iron and arsenic extracted in solution increased in comparison with the leach at pH 2.0, but that once again, the use of the mixed calcium hydroxide/sodium hydroxide mixed base of the present invention resulted in a substantially higher proportion of the desired metals being retained in solution in comparison with neutralisation to the same pH with entirely calcium hydroxide. A similar result was obtained after neutralisation to both pH 3.5 and 4.5 in respect of the desired metals, but that the higher pH was desirable in order to minimise the extent of arsenic remaining in solution. Thus, just over 90% of the cobalt was retained in the solution using the mixed base, whereas rather less than 70% was retained using solely calcium hydroxide. Likewise the figures for nickel dropped from about 98% to about 75%, for copper (which was more sensitive to pH) from 100/74% to about 11/11% and zinc from 96/90% to 59/51%.

We claim:

1. A process for the purification of an aqueous acidic leach liquor obtained by contacting a solid minerals mass containing one or more of the metals, cobalt, nickel, copper, and zinc together with iron and arsenic with a sulphuric acid solution, in which purification process the iron and arsenic in solution are oxidised to, respectively, ferric and arsenic ions by introduction of peroxomonosulphuric acid, and the leach liquor is subsequently partially neutralised to a pH in the range of 3.5–4.8 by the introduction of a mixed neutralising agent comprising from 40–60 molar% calcium oxide or hydroxide and the balance sodium hydroxide.

2. A process according to claim 1 in which the oxidation of iron and arsenic in solution is effected in the presence of the solid minerals mass.

3. A process according to claim 1 in which the minerals mass comprises a calcined sulphidic ore.

4. A process according to claim 1 in which the leach liquor is maintained at pH 1.7 to pH 2.1 during extraction of the metals from the mineral mass.

5. A process according to claim 1 in which the extraction is effected at a temperature of 50° to 80° C.

6. A process according to claim 1 in which the amount of peroxomonosulphuric acid introduced is from 1 to 2.5 times the stoichiometric amount to oxidise the iron and arsenic in solution.

7. A process according to claim 7 in which the peroxomosulphuric acid is added in such amounts as to maintain the liquor at a potential in the range 500 to 800 mV with respect to a standard calomel electrode.

8. A process according to claim 1 in which the minerals mass comprises a calcined sulphidic ore from which metals are extracted at a temperature of 50° to 80° C., using a leach liquor maintained at pH 1.7 to pH 2.1 and at a potential in the range 500 to 800 mV with respect to a standard calomel electrode.

9. A process according to claim 8 in which the oxidation of iron and arsenic in solution is effected in the presence of the solid minerals mass.

10. A process according to claim 1 in which the neutralisation is effected in the presence of any solids that were present in the preceding oxidation.

11. A process according to claim 10 in which the liquor is neutralised to to a pH in the range of pH 4 to 4.8.

12. A process according to claim 10 in which the calcium and sodium bases are added separately.

13. A process according to claim 12 in which there is added approximately half the total amount of calcium base alone that would be needed to take the pH to the desired pH and simultaneously or later the pH is adjusted to the desired pH by addition of sodium hydroxide.

14. A process according to claim 1 in which the solid minerals mass is contacted with a leach liquor maintained at a potential of at least 500 mV and at a pH of 1.7 to 2.1 and without separating the liquor from the residual solids subsequently neutralising the liquor to at least pH 3.5.

15. A process according to claim 14 in which the liquor is neutralised to at least pH 4.0.

16. A process according to claim 15 in which the neutralisation is effected using about half the amount of calcium base that would be needed alone to attain the desired pH and the neutralisation is completed with sodium base.

* * * * *